United States Patent [19]
Primiano et al.

[11] Patent Number: 5,438,370
[45] Date of Patent: Aug. 1, 1995

[54] APPARATUS AND METHODS FOR PROVIDING CLOSE CAPTIONING IN A DIGITAL PROGRAM SERVICES DELIVERY SYSTEM

[75] Inventors: Guy A. Primiano, Cumming; Ajith N. Nair, Lawrenceville, both of Ga.

[73] Assignee: Scientific Atlanta, Atlanta, Ga.

[21] Appl. No.: 275,332

[22] Filed: Jul. 14, 1994

Related U.S. Application Data

[63] Continuation of Ser. No. 6,476, Jan. 21, 1993, abandoned.

[51] Int. Cl.⁶ .......................................... H04N 7/087
[52] U.S. Cl. .................................. 348/476; 348/478
[58] Field of Search ............ 348/563, 473, 476, 478, 348/461, 465, 467, 468; H04N 7/08, 7/087

[56] References Cited

U.S. PATENT DOCUMENTS 4,361,848  11/1982  Poignet et al. .................. 348/468
5,181,113  1/1993   Chang .............................. 348/468

FOREIGN PATENT DOCUMENTS 2225519  5/1990  United Kingdom ........ H04N 7/087

OTHER PUBLICATIONS

U.S. Patent Application Ser. No. 968,846, filed Oct. 30, 1992, entitled "System and Method For Transmitting a Plurality of Digital Services."

Primary Examiner—Victor R. Kostak
Assistant Examiner—Nathan J. Flynn
Attorney, Agent, or Firm—Woodcock Washburn Kurtz Mackiewicz & Norris

[57] ABSTRACT

An apparatus for providing close captioning in a digital program services delivery system comprises: a rate converter circuit for receiving video codes and outputting video data; a video decoder circuit for receiving the video data and outputting digital Y, U, V data; a digital to analog converter/analog encoder circuit for converting the Y, U, V data into an analog video signal in a prescribed format; a line 21 former circuit for receiving close captioning digital data and forming a line 21 analog signal; and a multiplexor for inserting the line 21 analog signal into the analog video signal.

13 Claims, 9 Drawing Sheets

APPARATUS AND METHODS FOR PROVIDING CLOSE CAPTIONING IN A DIGITAL PROGRAM SERVICES DELIVERY SYSTEM

This is a continuation of application Ser. No. 08/006,476, filed Jan. 21, 1993 now abandoned.

FIELD OF THE INVENTION

The present invention relates generally to digital television systems, and relates particularly to apparatus and methods for providing close captioning in a digital program services delivery system.

BACKGROUND OF THE INVENTION

The background of the present invention is described herein in the context of pay television systems, such as cable television and direct broadcast satellite (DBS) systems, that distribute a variety of program services to subscribers, but the invention is by no means limited thereto except as expressly set forth in the accompanying claims.

In the pay television industry, programmers produce programs for distribution to various remote locations. A "program" may consist of video, audio and other related services, such as closed-captioning and teletext services. A single programmer may wish to supply many programs and services. Typically, a programmer will supply these services via satellite to individual subscribers (i.e., DBS subscribers) and/or cable television operators. In the case of cable television operators, the services transmitted via satellite are received at the operator's cable head-end installations. A cable operator typically receives programs and other services from many programmers and then selects the programs/services it wishes to distribute to its subscribers. In addition, a cable operator may insert locally produced services at the cable-head end. The selected services and locally produced services are then transmitted to the individual subscribers via a coaxial cable distribution network. In the case of DBS subscribers, each subscriber is capable of receiving a satellite down-link from the programmers directly.

In the past, pay television systems, including cable and DBS systems, have operated in the analog domain. Recently, however, the pay television industry has begun to move toward all digital systems wherein, prior to transmission, all analog signals are converted to digital signals. Digital signal transmission offers the advantage that digital data can be processed at both the transmission and reception ends to improve picture quality. Further, digital data compression techniques (e.g., DCT) have been developed that achieve high signal compression ratios. Digital compression allows a larger number of individual services to be transmitted within a fixed bandwidth. Bandwidth limitations are imposed by both satellite transponders and coaxial cable distribution networks, and therefore digital compression is extremely advantageous.

Further background can be found in U.S. patent application Ser. No. 968,846, Oct. 30, 1992, titled System and Method for Transmitting a Plurality of Digital Services. This application is hereby incorporated by reference as if fully set forth herein.

SUMMARY OF THE INVENTION

In preferred embodiments of the present invention, the line 21 former circuit comprises a data stripper and storage circuit receiving close captioning (CC) data, a CC enable signal, and a clock signal and outputting data representing two CC characters per line 21; a register receiving a frame sync signal and storing the CC characters in response thereto, whereby two CC characters are stored on a frame boundary; a start bit and dead time insert circuit coupled to the register; a line 21 interval former circuit receiving a line 21 enable signal and outputting timing signals in response thereto; a digital sinewave generator outputting a digital waveform signal; a second multiplexor outputting CC data at a prescribed rate; a digital to analog summing network receiving the CC data and outputting an analog CC signal; and a low pass filter filtering the analog CC signal and outputting a filtered analog line 21 signal.

In addition, embodiments of the invention may advantageously comprise means for providing microcode to the video decoder circuit. The microcode comprising instructions for generating the digital Y, U, V data.

A method in accordance with the present invention comprise the steps of: decoding discrete cosine transform (DCT) compressed video codes and generating video data corresponding thereto; converting the video data into digital Y, U, V data; converting the Y, U, V data into an analog baseband video signal in a prescribed format; processing close captioning digital data and forming a line 21 analog signal representative thereof; and inserting the line 21 analog signal into the analog baseband video signal.

The system disclosed hereinbelow provides for the transport of text and close-captioning data separately in the multiplexor from video and audio data. Analog NTSC video provides close captioning data on line 21 of every other video field, i.e., once per frame. To transport that data separately in the multiplexor, it must first be extracted from the analog NTSC signal at the encoder. Then, at the decoder, line 21 must be regenerated and reinserted in the reconstructed NTSC analog signal provided to a subscriber's television.

The present specification describes an apparatus and method whereby line 21 reconstruction is performed digitally before converting the line 21 data to an analog signal. Consequently, the entire process can be carried out in one ASIC implementation rather than a mixture of discrete analog and digital circuits. The present invention eases manufacturing and reduces decoder costs. Other features and advantages of the present invention are described below.

DETAILED DESCRIPTION OF PREFERRED EMBODIMENTS

A portion of the disclosure in application Ser. No. 968,846 is summarized hereinbelow to provide further information useful in explaining a specific application of the present invention. The present invention is specifically described below with reference to FIGS. 6–9.

Figure 1:
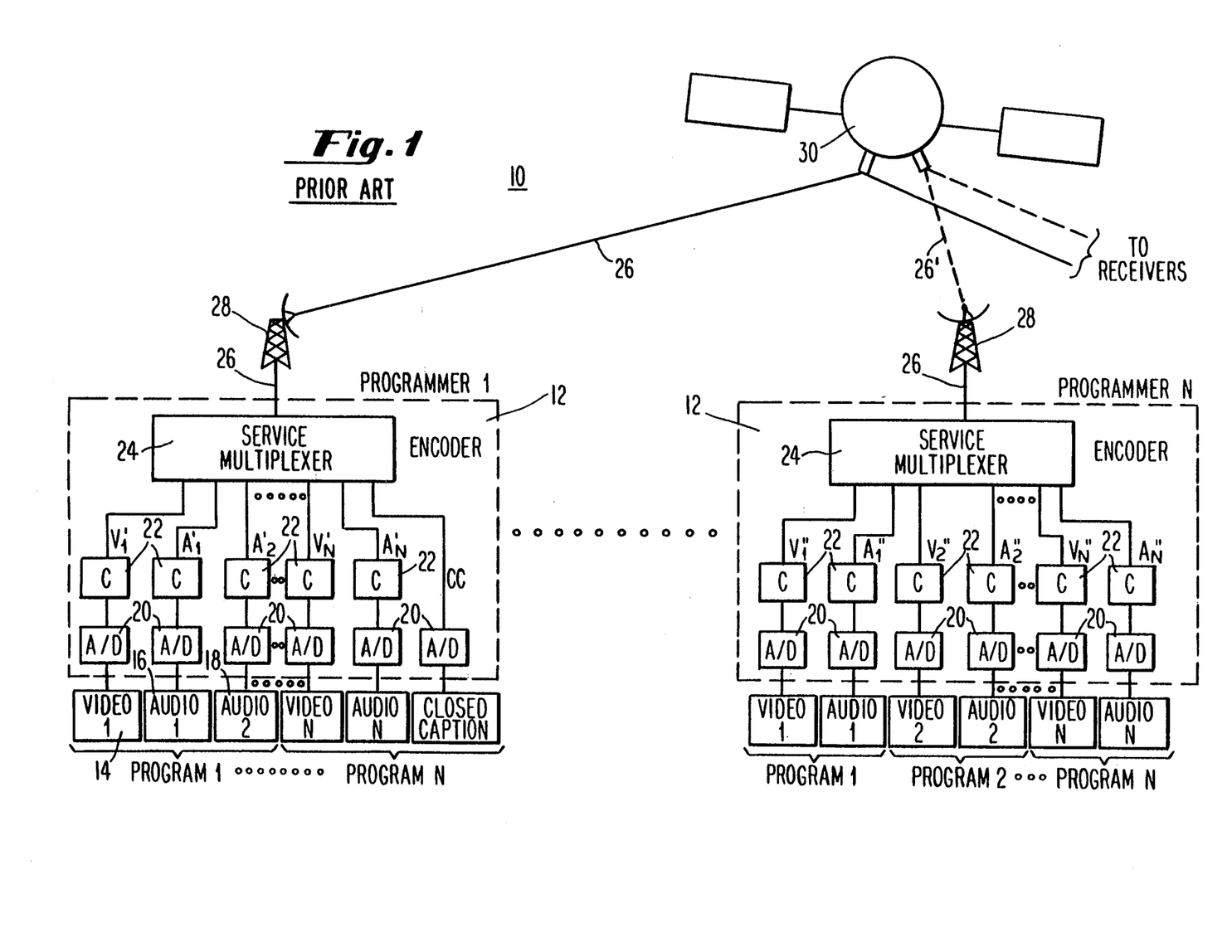
FIG. 1 is a partial block diagram of a system for multiplexing a plurality of digital services for transmission to a plurality of remote locations, as described in U.S. patent application Serial No. 968,846.

FIG. 1 shows a partial block diagram of a system 10 for multiplexing a plurality of digital services for transmission to a plurality of remote locations (not shown). In the pay television context, the system 10 comprises a plurality of service encoders 12 each of which is operated by a "programmer." As illustrated, any number N of programmers may be present in the system 10. As mentioned in the background, programmers are entities that provide "programs" for distribution to various subscribers. For example, as shown in FIG. 1, programmer1 may provide programs1 . . . N. Each program comprises a set of related services, such as video, audio and closed-captioning services. By way of example, FIG. 1 shows that programmer1 is providing program1 which comprises a video service 14 and two related audio services 16, 18. A given program can comprise a collection of related services, and a programmer may provide any number of programs.

Typically, the individual services of each program are produced in an analog format. According to the system and method of the present invention, each encoder 12 has a plurality of analog-to-digital converters 20 for converting services in analog form to digital services. In addition, video and audio services may be compressed by video and audio compression devices 22, however, compression is not required. As those skilled in the art know, there are many video and audio compression techniques available. For example, the Motion Pictures Expert Group (MPEG) has developed a video compression algorithm that is widely used in the digital video services industry. Vector quantization is another, more recent compression technique for digital video. According to the present invention, any compression algorithm may be employed by the video and audio compression devices 22, and the devices 22 are by no means limited to any one compression method. Furthermore, as mentioned above, compression of audio and video services is not required. Compression merely serves to increase the amount of data that can be transmitted within a given bandwidth.

Each encoder further comprises a service multiplexer 24. As described hereinafter in greater detail, the service multiplexers 24 function in accordance with the method of the present invention to multiplex the individual digital services for transmission to remote locations (not shown), such as a cable head-end installation or DBS subscriber. The service multiplexer 24 in each encoder 12 generates a multiplex data stream which is fed to a transmitter 28 for transmission to the remote locations via a satellite 30. As illustrated in FIG. 1, each programmer (e.g., programmer1 . . . programmerN) provides its own multiplex data stream 26. As described hereinafter in greater detail, the multiplex data streams may be received at various remote locations, such as a cable head-end, a DBS subscriber or a cable subscriber. Each remote location employs a service demultiplexer which extracts selected services from the multiplex stream in accordance with the method of the present invention. Further details of the service demultiplexer will be provided hereinafter.

Figure 2:
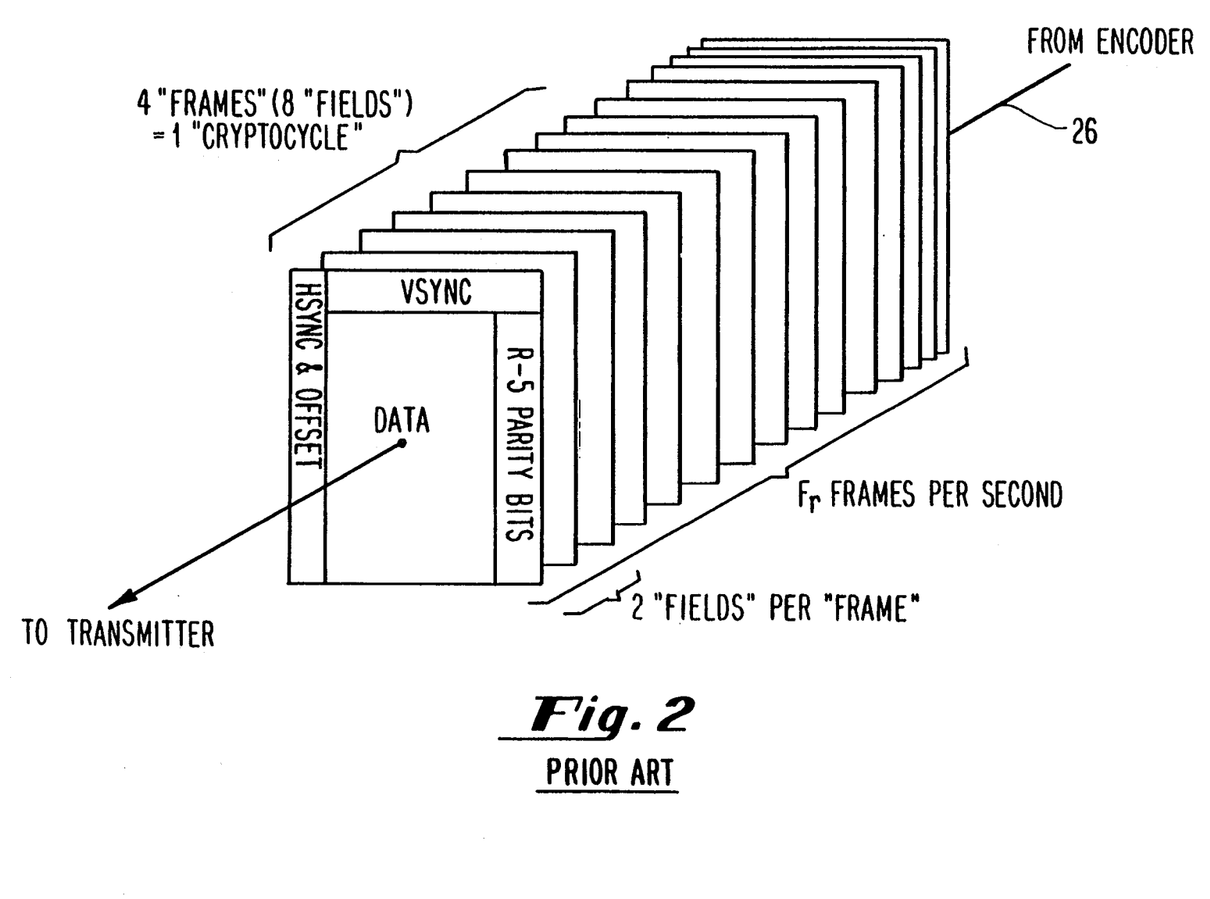
FIG. 2 is a graphical illustration of the multiplex data stream generated by each encoder of FIG. 1.

FIG. 2 is a graphical illustration of the multiplex data stream 26 generated by each service multiplexer 24 in each encoder 12. According to the present invention, the multiplex data stream 26 comprises a continuous sequence of "frames." Each frame consists of two "fields" as shown. As described hereinafter in greater detail, each field contains multiplexed service data and a "transport layer" that contains certain "system data" necessary for operating the system of the present invention. Because certain types of system data are too numerous to transmit in a single field, these types of data are transmitted over a series of fields referred to herein as a "cryptocycle." According to the present embodiment, a cryptocycle nominally comprises eight (8) fields; however, a cryptocycle can be defined by any number of fields. Essentially, cryptocycles define fixed boundaries in the multiplex data stream 26 within which a complete set of system and encryption related data is transmitted. As described hereinafter, the service demultiplexer at each remote location needs all the system data in a given cryptocycle in order to extract selected services from the service data contained in the next cryptocycle.

As explained above in connection with FIG. 1, the video services carried in a multiplex data stream typically originate as analog video signals (except for HDTV signals), and as shown in FIG. 1, the analog video signals are "digitized" by analog-to-digital converters 20 and thus become "digital services." As described hereinafter in greater detail, at subscriber locations, selected digital video services are extracted from the multiplex data stream for viewing on a display device, such as a television, for example. Prior to viewing, however, the digital video services must be converted back to their analog form. As those skilled in the art know, there are several analog video signal formats widely used in the television industries. The NTSC format is widely used in the United States, whereas the PAL format is used in most of Europe. In order to simplify hardware design and frequency generation throughout the system 10, the overall frame structure and transmission rate of the multiplex data stream 26 are related to, and depend upon, the particular analog video format of the video services being carried in the multiplex. The frame structure and digital transmission rate of the multiplex differ depending upon whether the video services carried in the multiplex are PAL video signals or NTSC video signals. Providing digital multiplex data rates and clocks that are related to key analog video frequencies simplifies hardware design throughout the system. In particular, the regeneration of analog video (as well as audio) signals at subscriber locations is greatly simplified.

Figure 3:
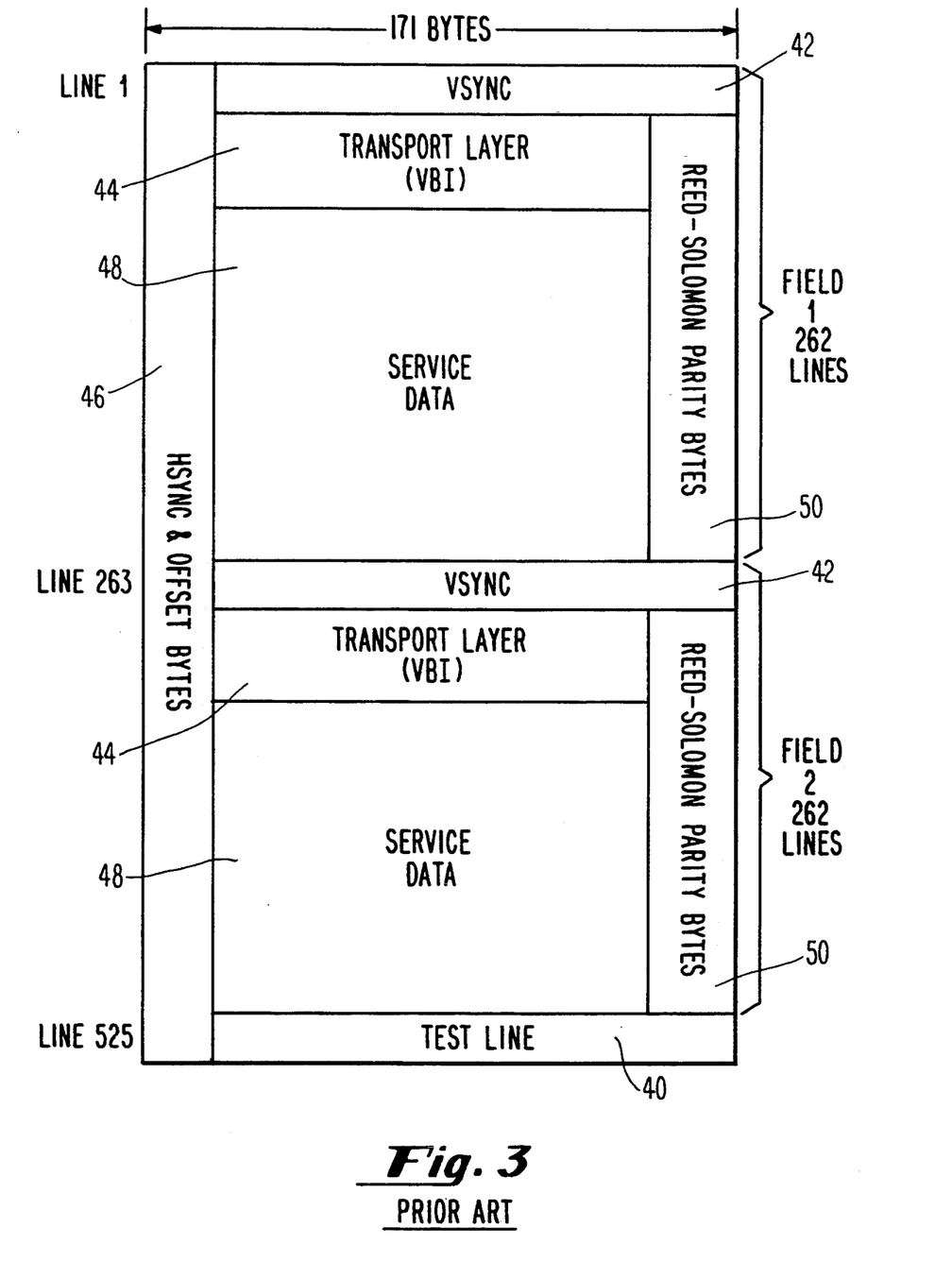
FIG. 3 shows in detail the general arrangement and contents of a frame of the multiplex data stream of FIG. 2 for transmitting NTSC video services.

FIG. 3 shows the general arrangement and contents of a frame of the multiplex data stream of FIG. 2 when the video services carried in the multiplex are based on the NTSC video signal format. The frame structure and transmission rate of the multiplex data stream are related to their analog NTSC counterparts. As described below in greater detail, for example, the overall data rate of the multiplex data stream is related to the analog television line frequency $F_h$, which in the case of NTSC video signals is 15.734 kHz (i.e., $F_h$=15.734 kHz). As illustrated in FIG. 3, a frame comprises a plurality of lines each of which are 171 bytes long (i.e., 1368 bits). In the present embodiment, wherein the video services carried are NTSC format signals, the frame has 525 lines. As those skilled in the art will recognize, the 525 lines of the frame correspond to the number of lines in an analog NTSC picture. Additionally, each frame consists of two "fields," each of which contains 262 lines. A test line 40 is added to the second field to achieve the 525 line total. As those skilled in the art will further recognize, this two-field structure is analogous to the two-field format of NTSC signals.

To achieve correspondence between the multiplex data rate and analog NTSC frequencies, each line of the frame is transmitted at a frequency equal to $F_h$, the horizontal line frequency. In the case of NTSC video, $F_h$ is 15.734 kHz. Thus, when NTSC video services are carried in the multiplex, the multiplex data rate is:

$$\frac{171 \text{ bytes}}{\text{line}} \times \frac{8 \text{ bits}}{\text{byte}} \times F_h =$$

$$1368 \times F_h = 1368 \times 15.734 \text{ kHz} = 21.5 \text{ Mbps}$$

As expected, with 525 lines, the overall frame rate is 29.97 Hz which is equal to the analog frame rate of NTSC video signals. As those skilled in the art will recognize, the multiplex rate of 1368 $F_h$ does not exactly match the NTSC regeneration rate. The NTSC regeneration rate is actually 1365 $F_h$, and therefore, decoders at subscriber locations must perform a rate conversion in order to accurately regenerate the analog NTSC video signals. A single 21.5 Mbps multiplex data stream may be modulated and transmitted within a 6 Mhz cable channel, and two 21.5 Mbps multiplex data streams can be interleaved and transmitted over a single C-Band satellite transponder.

Referring still to FIG. 3, each field of the frame begins with a VSYNC word 42, and each line begins with an HSYNC byte 46 followed by an offset byte. As described hereinafter, a service demultiplexer in a decoder at each subscriber location uses the HSYNC and VSYNC patterns to establish frame and field synchronization after receiving a multiplex data stream. The VSYNC word 42 is generated similarly for each field, but is bit-inverted every other field. The HSYNC byte 46 is the same for each line. The VSYNC word 42 in each field is followed by a "transport layer" 44. In general, the transport layer 44 in each field contains "system data" needed for operation of the system of the present invention, and more importantly, specifies the contents and structure of the "system data" and service data that follow in the field. As described hereinafter in greater detail, an important part of the transport layer 44 is the "multiplex map" (not shown) which follows directly after the VSYNC word 42 in each field. The multiplex map specifies the number and location of transport layer packets that follow in the field and is dynamically adjustable on a per field basis to achieve great flexibility.

As shown in FIG. 3, the transport layer 44 of each field is followed by a service data space 48 which contains the audio and video service data carried in the multiplex data stream. As explained hereinafter in greater detail, the plurality of video services and audio services carried in each field are variably partitioned within the field so that the system can accommodate multiple service data rates. The data rate for a service can vary from the HDTV rate (approx. 17 Mbps) to the telecommunications standard T1 data rate of 1.544 Mbps. The amount of data assigned to video, audio and other services can be adjusted among the services. Portions of the service data space not used for audio services may be reassigned as video or other service data. Audio services are not tied to video services within the field, and therefore, the system can provide "radio" services. Because of the dynamic allocation of service data within a field, the individual video services are not required to have the same data rate. The possible combinations of services that a programmer can provide in one multiplex data stream are limited only by the maximum data rate of the multiplex data stream (i.e., 21.5 Mbps) and the variable partitioning increment size. With the flexible method of the present invention, any future digital services with data rates as low as the telecommunications standard T1 rate can be accommodated. As further shown, the transport layer 44 and service data portion 48 of each frame are error coded using a 20 byte Reed-Solomon error correcting code. Those skilled in the art will appreciate, however, that any block-oriented error correcting scheme may be employed without deviating from the true spirit and scope of the present invention.

Figure 4:
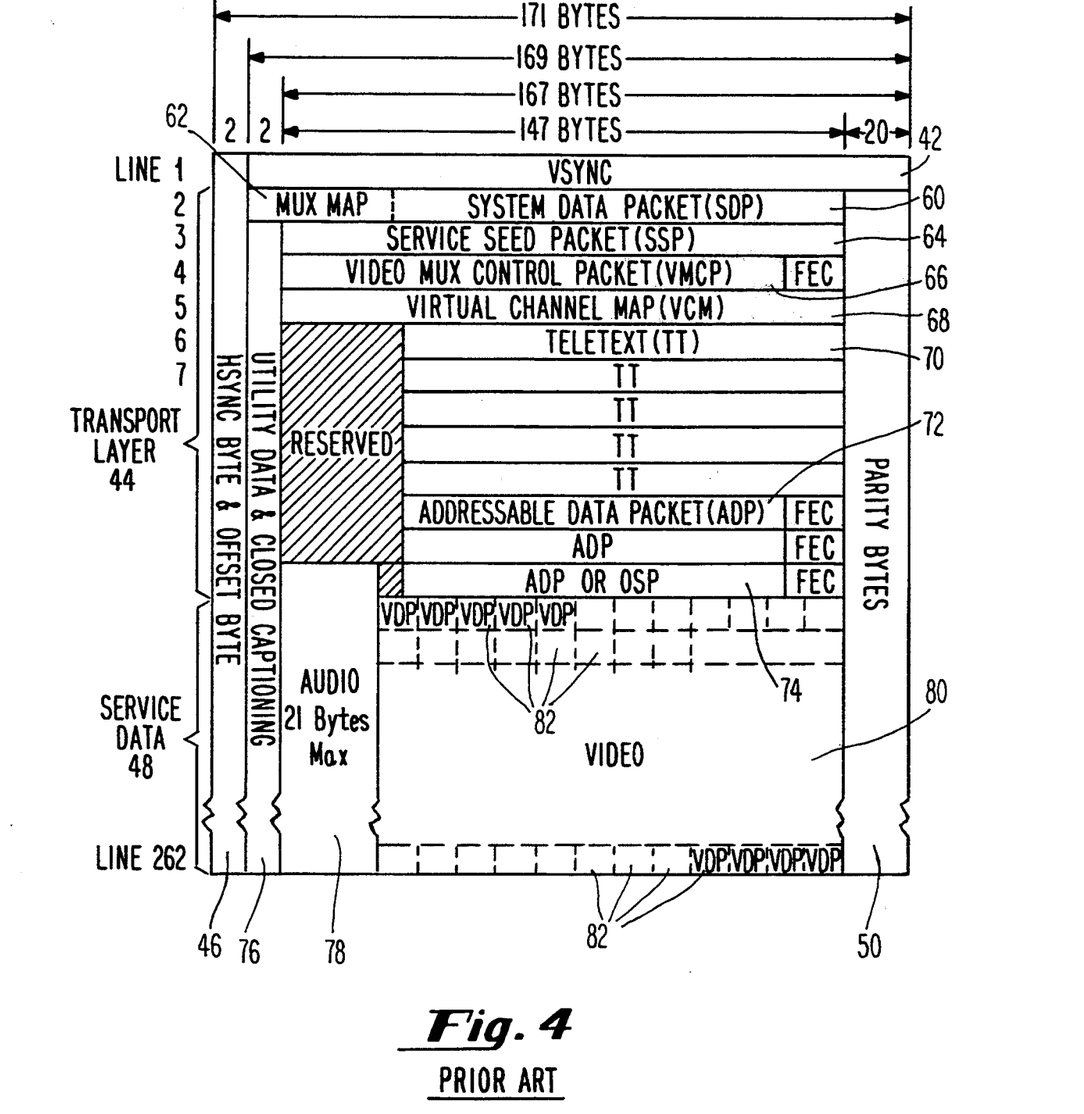
FIG. 4 shows in detail the data and services that can be carried in an exemplary first field of a frame of the multiplex data stream of FIG. 2.

FIG. 4 shows further details of the general arrangement and contents of the first field of an exemplary frame of a multiplex data stream in accordance with the present invention. As shown, the first line of the transport layer 44 (i.e., line 2 of the field) comprises a system data packet 60 (SDP) that includes a multiplex map 62. Subsequent lines of the transport layer may comprise service seed packets 64 (SSP), video multiplex control packets 66 (VMCP), virtual channel map packets 68 (VCM), teletext data packets 70 (TT), addressable data packets 72 (ADP), and optional system packets 74 (OSP). The multiplex map 62 is transmitted with each field and specifies the number and location of every other type of data packet in the transport layer 44 of that field. With the multiplex map 62, the number and location of each other type of transport layer packet may be dynamically altered on a per field basis to achieve a great degree of flexibility. For example, as described below in greater detail, the multiplex map 62 can be used in a "full-field" mode to allow an entire field of the multiplex data stream to be used for system data such as addressable data packets 74 (ADPs). It should be noted that not every type of transport layer packet need be transmitted in every field. For example, some packets, such as system seed packets 64 (SSPs), may be transmitted only in the first few fields of a cryptocycle. The content and arrangement of data within each packet will be described hereinafter in greater detail.

Still referring to FIG. 4, a portion of each field is allocated to service data 48. According to the method of the present invention, audio services, utility data and closed-captioning services and video services are separated within the field. As shown, utility and closed-captioning data may be transmitted at the beginning of each line of the transport layer 44 as well. The audio portion 78 of each field is proportionally allocated among the various audio services being transmitted. The size of the audio portion 78 of each field is adjustable for accommodating different numbers of audio services. According to a preferred embodiment, the audio portion 78 of each field consists of a maximum of 21 bytes on each line of the service data area 48.

The video portion 80 of the service data area 48 of each frame comprises a plurality of smaller video data packets 82 (VDPs). In the present embodiment, the VDPs are each 60 bits wide, although any size VDP may be used without deviating from the spirit and scope of the invention. Each of the 60 bits in an VDP may be allocated to a particular video service being transmitted. For example, if there are 5 video services being transmitted, each service could be allocated 12 bits out of every VDP. According to the method of the present invention, the 60 bits in each VDP are allocated among the various services in proportion to the individual data rate of each service. For example, a video service having a high rate may be allocated more bits in each VDP than a video service having a lower rate. Although the allocation of VDP bits in a single frame remains fixed, the allocation may be adjusted on a per frame basis. As explained hereafter in greater detail, the video multiplex control packets (VMCPs) 66 in the transport layer 44 specify the video service allocation within the VDPs of a given field. In the preferred embodiment, even though the VMCPs are transmitted in the transport layer of every field, the allocation of services within each VDP may be dynamically altered on a per frame basis only. In this manner, the system and method of the present invention supports statistical multiplexing. Those skilled in the art will appreciate, however, that the allocation of services within each VDP may be dynamically altered on a per field basis, if desired.

Figure 5:
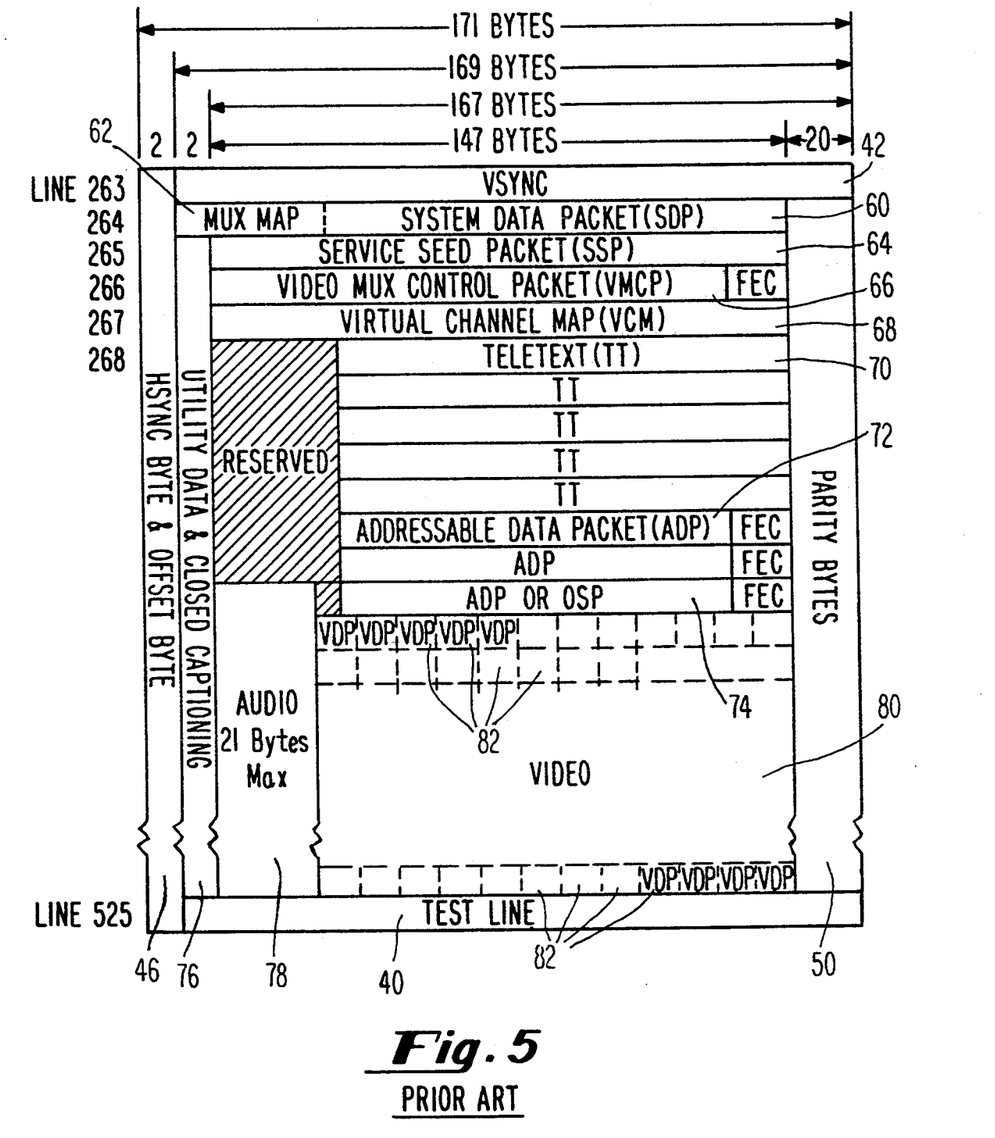
FIG. 5 shows in detail the data and services that can be carried in an exemplary second field of a frame of the multiplex data stream of FIG. 2.

FIG. 5 shows details of a second field of an exemplary frame of a multiplex data stream. As can be seen, the second field is generally similar in structure and arrangement to the first field; the main difference being the addition of the test line 40. As mentioned previously, the test line 40 is the last line of every frame of the multiplex data stream and allows each field to be exactly 261 lines (not including VSYNC). The test line 40 is not error coded with the Reed-Solomon code as are lines 264–524 of the second field. The test line may be used to carry system test data, if desired.

Referring to both FIGS. 4 and 5, the third and fourth bytes on each line of each field carry utility and closed-captioning data. Only the first 15 of 16 bits are utilized for utility data; the 16th bit is used for closed-captioning data. Additionally, five lines in each frame (i.e., both fields) do not carry utility and closed-captioning data. These include the two VSYNC lines 42, the test line 40 and lines 2 and 264 of the first and second fields respectively. The total bit capacity for utility data for one frame is then:

(525 −5)lines*(15 bits/line) = 7800 bits.

Those 7800 bits are partitioned into 8 separate "channels" of utility data. Thus, there are 975 bits/channel in each frame. These are error coded using a (3,2,13) convolution FEC to yield an error-corrected capacity of:

975*⅔ = 650 bits/channel/frame.

The resultant maximum data rate for each channel of utility data is then:

$$\frac{650 \text{ bits}}{\text{frame}} + \frac{1 \text{ Frame}}{525 \text{ lines}} \times \frac{15{,}743 \text{ lines}}{s} = 19.48 \text{ KBps}$$

This rate is slightly higher than the industry standard 19.2 KBps rate, but with the excess capacity, worst-case incoming data channels can be handled by running at the slightly higher rate. A 19.48 kHz clock is easily derived from $F_h$ since 19.48 kHz is equal to 2730/2205 $F_h$. This illustrates one advantage of relating the overall multiplex data rate to the horizontal line frequency. Alternatively, the utility data in each frame can be partitioned into 16 separate channels, where each channel runs at 9600 Kbps.

Closed-captioning data is transmitted in the last bit of the fourth byte of each line (i.e., bit 16 of the utility & closed-captioning data space). As with the utility data, closed-captioning data (i.e., 1 bit per line) is sent on the same 520 lines of each frame. As those skilled in the art know, video services often have associated closed-captioning data. In the analog NTSC format, two bytes (i.e., two characters) of closed-captioning data are sent on line 21 of each analog video frame. The 520 closed-captioning bits are partitioned into 20 separate "channels" of 26 bits each. Each "channel" corresponds to a different video service in the multiplex data stream. In each frame, therefore, up to 20 video services may carry associated closed captioning data. The first 26 bits in the frame correspond to video number 1, the second 26 bits correspond to video number 2, and so on. In the present embodiment, only the first sixteen bits of each 26 bit partition are used. Thus, as with line 21 in the analog NTSC format, two characters are transmitted per frame per video service.

Figure 6:
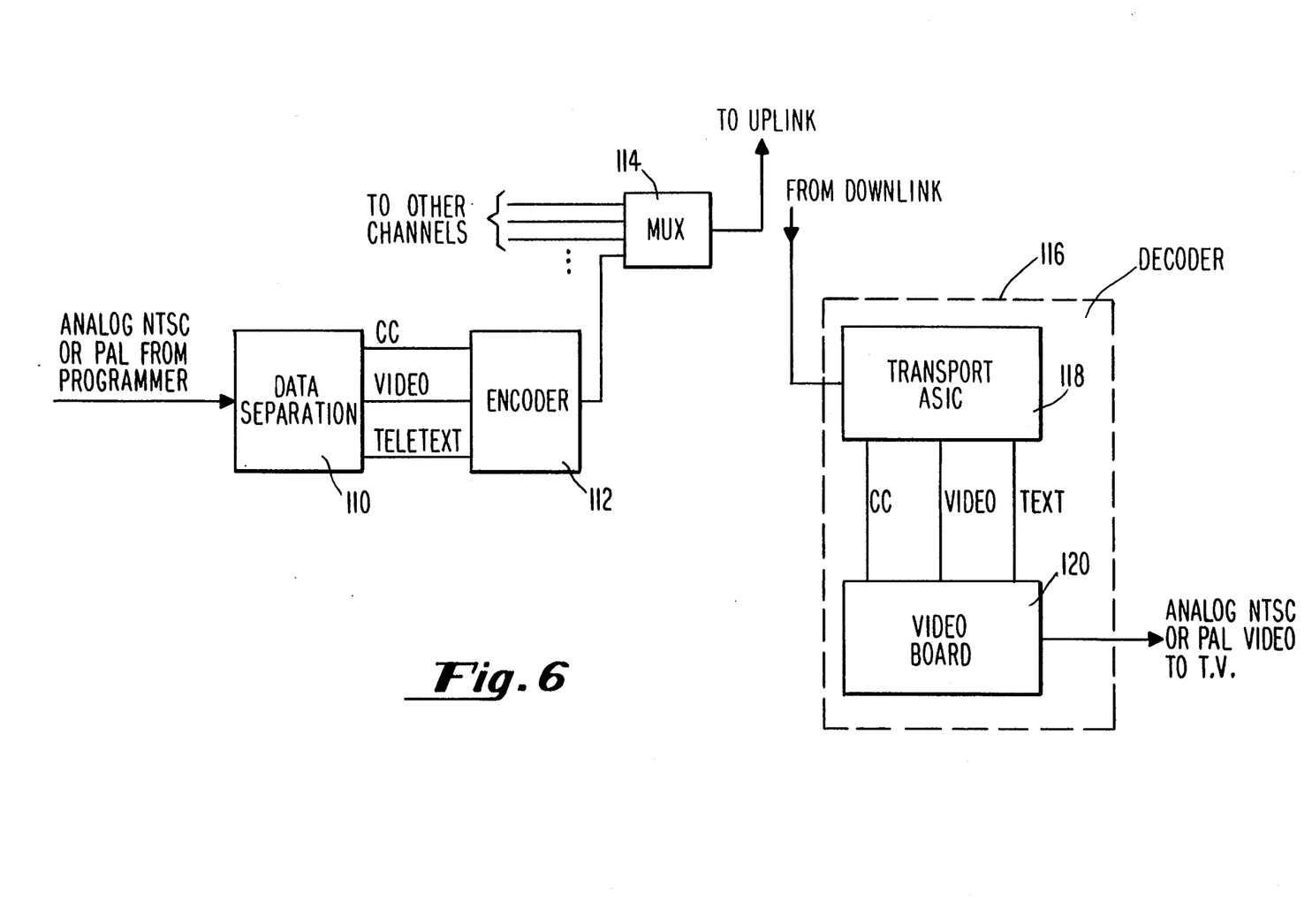
FIG. 6 is a block diagram illustrating, in a simplistic manner, an exemplary environment for the present invention.

FIG. 6 is a block diagram schematically illustrating one preferred environment for the present invention. This figure has been simplified to place the present invention in context. Analog NTSC video (or PAL) is received from the programmer, and the Close-captioning (CC) data is separated from the analog signal by a data separation circuit 110, which is commercially available. All the analog data is converted to digital data and eventually finds its way into the 21.5 Mbps Multiplex.

After being encoded by an MPEG encoder 112 and multiplexed by a multiplexer 114, the multiplexed data is fed to a transport ASIC 118 in a decoder 116 (i.e., after passing through the uplink and downlink channels), which decoder demultiplexes the data and provides the CC, TEXT and Video data separately to a video board 120 that digitally recreates the original line 21 and converts it to analog form. The video board also decodes the MPEG encoded video, converts it to analog and inserts line 21 in the appropriate field, thereby reproducing the original NTSC video signal. The system is also capable of reconstructing PAL video signals.

Figure 7:
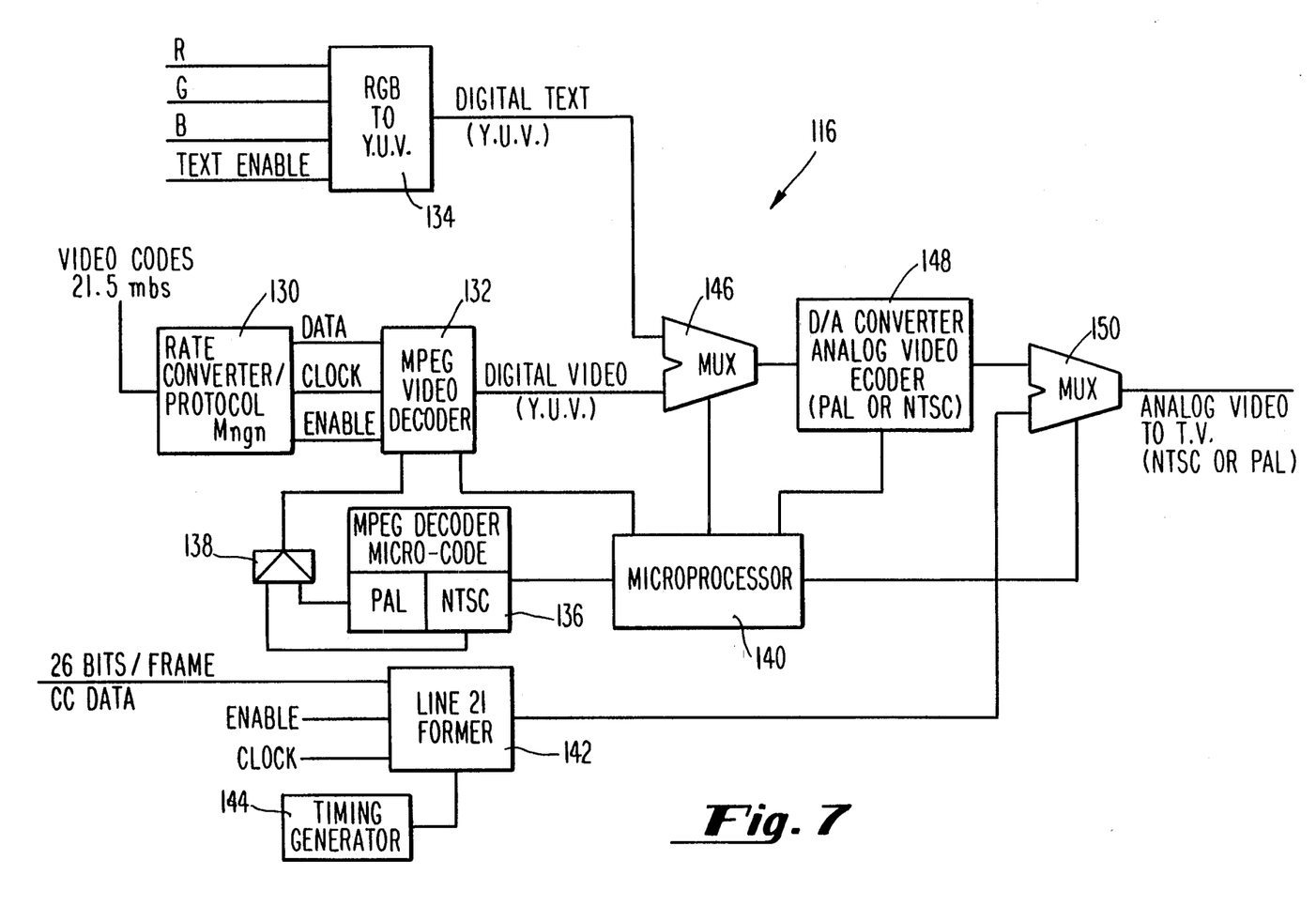
FIG. 7 is a block diagram of a decoder 116 in accordance with the present invention.

FIG. 7 shows details of the video board of FIG. 6. As shown, teletext data in digital RGB form is received and fed to an RGB-to-YUV converter 134 and then passed to a multiplexor 146. MPEG encoded video is received at the 21.5 Mbps rate and fed to a rate converter/protocol manager 130. From there the encoded video is decoded using an MPEG Video Decoder Chip 132, which is available from C-Cube Microsystems (part no. CL950). The MPEG Chip is capable of decoding both NTSC and PAL video, depending on the microcode it receives from a memory 136 via a switch 138. The decoded video is then sent to the other input of the multiplexor 146. Thus, either teletext or decoded NTSC (or PAL) video will be provided to a D/A converter-/Analog video encoder 148, the latter device outputting baseband video signals. The D/A converter is capable of producing either NTSC or PAL analog signals from digital inputs. The microprocessor tells both the MPEG decoder and the analog video encoder which signal to produce. The multiplexer is described in detail in the above-referenced U.S. patent application Ser. No. 968,846.

Close-captioning data is fed to the decoder 116 at a rate of 26 bits per frame. As shown in FIG. 7, the 26 bits of CC data are passed to a line 21 former circuit 142, which regenerates line 21 in analog form. The line 21 former circuit and an associated timing generator circuit 144 are described below with reference to FIG. 8. Once formed, line 21 is inserted into the proper NTSC analog video field by a second multiplexor 150. The circuit is controlled by a microprocessor 140.

Figure 8:
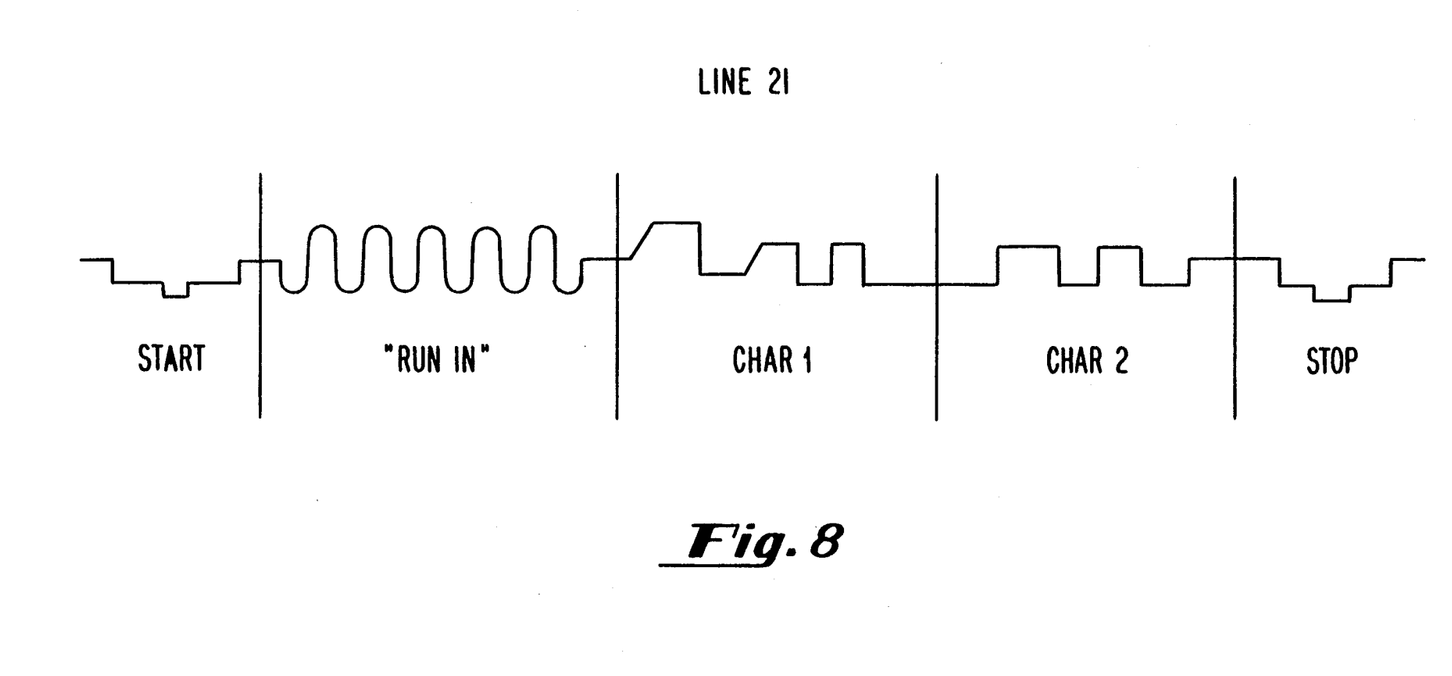
FIG. 8 depicts an exemplary line 21 waveform in accordance with the present invention.

FIG. 8 illustrates the line 21 waveform. The signal begins with a start bit. The start bit is followed by a sinewave (RUN IN) which is used to alert a CC decoder and establish synchronization. The sinewave is followed by two characters of close-captioning text (CHAR 1, CHAR 2). A stop bit (STOP) follows. When a subscriber buys a close-captioning decoder, that decoder simply pulls line 21 out of every NTSC frame, buffers the CC text characters until full sentences have been received, and then displays them on the screen for the user to read. This process is described below.

Figure 9:
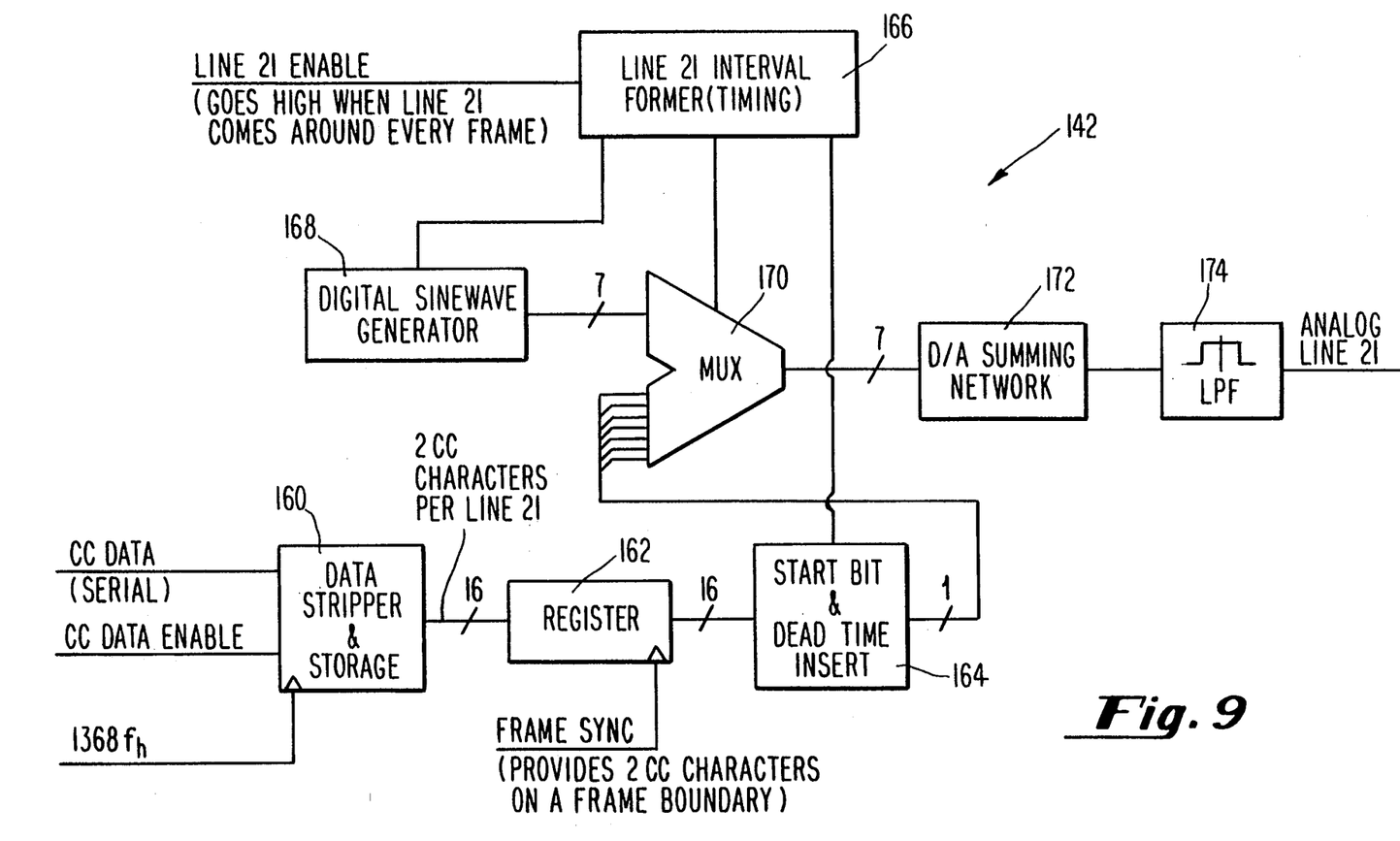
FIG. 9 is a block diagram of the line 21 former circuit 142 of FIG. 7.

FIG. 9 depicts details of the line 21 former circuit 142 of FIG. 7. The 26 bits of CC data provided in each frame are received by a data stripper and storage unit 160 that buffers the received data and separates every two characters (i.e., bytes) of CC data. The two characters to be inserted in a given line 21 are then stored in a 16-bit register 162. The register is clocked with a frame sync signal so that the characters are provided on a frame boundary (recall that line 21 is provided every other field, i.e., once per frame). The two characters are then sent to a circuit 164 that inserts the start bit and required dead time into the signal. The CC information is still digital at this point. This is then fed to a multiplexor 170. A digital sinewave generator 168 creates a digital sinewave which is supplied to the other input if the multiplexor 170.

When line 21 is required to be formed, the line 21 enable line goes high for the entire line 21 interval. This enables the Line 21 interval former circuit 166, which controls the timing of various circuit components. Specifically, the line 21 interval former controls the multiplexor 170, the sinewave generator 168, and the start bit and dead-time insert circuit 164 so that a complete digital representation is converted to analog in a D/A summing network 172. The analog signal is then low-pass filtered by a filter 174 to remove sharp edges. The result is an analog reconstruction of the original line 21 that was separated from the NTSC video at the encoder 112. The reconstructed line 21 is then inserted into the appropriate analog NTSC field.

One advantage of the circuit of FIG. 9 is that line 21 is first completely reconstructed digitally. Specifically, the sinewave is reconstructed digitally, and then the entire digital representation is D/A converted. Another option would be to generate the sinewave in analog. However, by constructing the sinewave digitally, the entire line 21 former circuit can be implemented in a single ASIC. Thus, a mix of discrete analog and digital circuitry is not required.

It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. An apparatus for providing close captioning in a digital program services delivery system, comprising:
   (a) a rate converter circuit receiving video codes and outputting video data;
   (b) a video decoder circuit, coupled to said rate converter circuit, receiving said video data and outputting digital component video data;
   (c) a digital to analog converter/analog encoder circuit, operatively coupled to said video decoder circuit, converting said component video data into an analog video signal in a prescribed format;
   (d) a line former circuit receiving digital text data and forming a line of analog text signal; and
   (e) a multiplexor, coupled to said digital to analog converter/analog encoder circuit and said line former circuit, inserting said line of analog text signal into said analog video signal.

2. The apparatus recited in claim 1, wherein said line former circuit comprises:
   a data stripper and storage circuit receiving digital text data, an enable signal, and a clock signal and outputting data representing two text characters per line;
   a register, coupled to said data stripper and storage circuit, receiving a frame sync signal and storing said text characters in response thereto, whereby two text characters are stored on a frame boundary;
   a start bit and dead time insert circuit coupled to said register;
   a line interval former circuit receiving a line enable signal and outputting timing signals in response thereto;
   a digital sinewave generator, coupled to said line interval former circuit, outputting a digital waveform signal;
   a second multiplexor, coupled to said start bit and dead time insert circuit, digital sinewave generator, and line interval former circuit, outputting text data at a prescribed rate;
   a digital to analog summing network, coupled to said second multiplexor, receiving said text data and outputting an analog text signal; and
   a low pass filter, coupled to said digital to analog summing network, filtering said analog text signal and outputting said line of analog text signal.

3. The apparatus recited in claim 1, further comprising means for providing microcode to said video decoder circuit, said microcode comprising instructions for generating said digital component video data.

4. The apparatus recited in claim 2, further comprising means for providing microcode to said video decoder circuit, said microcode comprising instructions for generating said digital component video data.

5. Means for providing close captioning in a digital program services delivery system, comprising:
   (a) rate converter means for receiving discrete cosine transform (DCT) compressed video codes and outputting video data;
   (b) motion pictures expert group (MPEG) video decoder means coupled to said rate converter means for receiving said video data and outputting digital component video data;

(c) digital to analog converter/analog encoder means operatively coupled to said MPEG video decoder means for converting said component video data into an analog baseband video signal in a prescribed format;

(d) line former means for receiving digital text data and forming a line of analog text signal; and (e) multiplexor means, coupled to said digital to analog converter/analog encoder means and said line former means, for inserting said line of analog text signal into said analog baseband video signal.

6. The apparatus recited in claim 5, wherein said line former means comprises:

data stripper and storage means for receiving digital text data, an enable signal, and a clock signal and outputting data representing two text characters per line;

register means coupled to said data stripper and storage means for receiving a frame sync signal and storing said text characters in response thereto, whereby two text characters are stored on a frame boundary;

start bit and dead time insert means coupled to said register means;

line interval former means for receiving a line enable signal and outputting timing signals in response thereto;

digital sinewave generator means coupled to said line interval former means for outputting a digital waveform signal;

second multiplexor means, coupled to said start bit and dead time insert means, digital sinewave generator means, and line interval former means, for outputting text data at a prescribed rate;

digital to analog summing means coupled to said second multiplexor means for receiving said text data therefrom and outputting an analog text signal; and low pass filter means coupled to said digital to analog summing means for filtering said analog text signal and outputting said line of analog text signal.

7. The apparatus recited in claim 5, further comprising means for providing microcode to said MPEG video decoder means, said microcode comprising instructions for generating said digital component video data.

8. The apparatus recited in claim 6, further comprising means for providing microcode to said MPEG video decoder means, said microcode comprising instructions for generating said digital component video data.

9. A method for providing text insertion in a digital program services delivery system, comprising the steps of:

(a) decoding discrete cosine transform (DCT) compressed video codes and generating video data corresponding thereto;

(b) converting said video data into digital component video data;

(c) converting said component video data into an analog baseband video signal in a prescribed format;

(d) processing digital text data and forming a line of analog text signal representative thereof; and (e) inserting said line of analog text signal into said analog baseband video signal.

10. An apparatus for providing close captioning in a digital program services delivery system, comprising:

(a) a video decoder circuit receiving encoded digital video data and outputting decoded digital video data;

(b) a digital to analog converter/analog encoder circuit, operatively coupled to said video decoder circuit, converting said decoded digital video data into an analog video signal in a prescribed format;

(c) a line former circuit receiving digital text data and forming a line of analog text signal; and (d) a multiplexor, coupled to said digital to analog converter/analog encoder circuit and said line former circuit, inserting said line of analog text signal into said analog video signal.

11. An apparatus as recited in claim 10, wherein said video decoder circuit comprises a motion pictures expert group (MPEG) video decoder.

12. Means for providing close captioning in a digital program services delivery system, comprising:

(a) motion pictures expert group (MPEG) video decoder means for receiving encoded digital video data and outputting decoded digital video data;

(b) analog encoder means, operatively coupled to said MPEG video decoder means, for converting said decoded digital video data into an analog video signal in a prescribed format;

(c) line former means for receiving digital text data and forming a line of analog text signal; and (d) means coupled to said analog encoder means and said line former means for inserting said line of analog text signal into said analog video signal.

13. A method for providing text insertion in a digital program services delivery system, comprising the steps of:

(a) decoding encoded digital video codes and generating digital video data corresponding thereto;

(b) converting said digital video data into decoded digital video data;

(c) converting said decoded digital video data into an analog baseband video signal in a prescribed format;

(d) processing digital text data and forming a line of analog text signal representative thereof; and (e) inserting said line of analog text signal into said analog baseband video signal.

* * * * *

UNITED STATES PATENT AND TRADEMARK OFFICE
CERTIFICATE OF CORRECTION

PATENT NO. : 5,438,370
DATED : August 1, 1995
INVENTOR(S) : Guy A. Primiano and Ajith N. Nair It is certified that error appears in the above-indentified patent and that said Letters Patent is hereby corrected as shown below:

Col. 1, after Summary of Invention, the following was missing in the patent:

--In accordance with the present invention, an apparatus for providing close captioning <u>or text insertion</u> in a digital program services delivery system comprises a rate converter circuit receiving video codes and outputting video data; a video decoder circuit receiving the video data and outputting digital Y, U, V <u>(component video)</u> data; a digital to analog converter/analog encoder circuit converting the Y,U,V data into an analog video signal in a prescribed format; a line [21] former circuit receiving close captioning digital data <u>or digital text data</u> and forming a line [21] <u>of</u> analog <u>text</u> signal; and a multiplexor inserting the line [21] <u>of</u> analog <u>text</u> signal into the analog video signal.--

Signed and Sealed this

Thirty-first Day of December, 1996

Attest:

BRUCE LEHMAN

*Attesting Officer*     *Commissioner of Patents and Trademarks*